United States Patent [19]

Messina

[11] Patent Number: 5,634,128

[45] Date of Patent: *May 27, 1997

[54] METHOD AND SYSTEM FOR CONTROLLING ACCESS TO OBJECTS IN A DATA PROCESSING SYSTEM

[75] Inventor: Massimo Messina, Rome, Italy

[73] Assignee: International Business Machines Corporation, Armonk, N.Y.

[ * ] Notice: The term of this patent shall not extend beyond the expiration date of Pat. No. 5,471,619.

[21] Appl. No.: 507,921

[22] Filed: Jul. 27, 1995

Related U.S. Application Data

[62] Division of Ser. No. 126,463, Sep. 24, 1993, Pat. No. 5,471,619.

[51] Int. Cl.$^6$ .................................................... G06F 12/00
[52] U.S. Cl. .................... 395/682; 395/726; 395/683
[58] Field of Search ..................... 395/650, 700, 395/726

[56] References Cited

U.S. PATENT DOCUMENTS

5,471,619  11/1995  Messina .................................. 395/600

Primary Examiner—Kevin A. Kriess
Assistant Examiner—John Q. Chavis
Attorney, Agent, or Firm—Prentiss Wayne Johnson

[57] ABSTRACT

A method and system are provided for controlling the access objects in an object oriented data processing application, where the objects are being hierarchically structured and either locally available or retrievable from an external unit. Each object has a dependent object counter which indicates the existence or the number of dependent objects associated with that object. When at least one dependent object is not locally available, a dummy object is appended to that object, enabling the object expansion even if the dependent objects of the selected object are not yet locally available in local memory. The objects to be retrieved from the external unit are locked from user access, while access is allowed to the locally available dependent objects.

12 Claims, 7 Drawing Sheets

METHOD AND SYSTEM FOR CONTROLLING ACCESS TO OBJECTS IN A DATA PROCESSING SYSTEM

This is a divisional of application Ser. No. 08/126,463 filed on Sep. 24, 1993, now U.S. Pat. No. 5,471,619.

FIELD OF THE INVENTION

The present invention relates in general to object oriented data processing applications and in particular to a method and system for controlling the access to the objects in such applications.

Still more particularly, the present invention relates to a method and system for increasing the throughput during access to the objects in such applications where the objects are hierarchically structured and each of the objects may be either available locally or retrievable from an external unit.

BACKGROUND OF THE INVENTION

Object oriented programming is well-known to those skilled in the art of data processing. Object oriented programming provides greater manageability, ease of use, simplicity and product integration in complex application environments such as distributed data processing systems. Object orientation provides software modeling techniques which use individual "object" components that can be constructed into complex systems. One way of logically arranging objects is as a hierarchy of parent objects and child objects where one or more child objects are dependent on each parent object.

Some application programs, particularly those running cooperatively in a distributed system, typically process both locally available objects and objects that must be retrieved from an external unit, such as a remote computer system.

A graphical interface may allow a user to interact with the system to have the system perform user selected operations on an object. For example, a user can select an object by placing a mouse cursor over a displayed object and clicking on a mouse button.

A user can interactively open or expand a displayed object to display objects dependent on the displayed object by issuing such a command after selecting the displayed object. Whenever an open/expand command for a selected object is issued by a user from a computer terminal, the dependent objects (if any) defined as dependent on the selected object are displayed for the user.

All of the objects dependent on the selected object that are already locally present are displayed to the user for further operations. However, the whole application processing typically becomes locked until all the objects requested by the user or other application are retrieved from the external unit(s) thus preventing further operations from being performed on these objects. For example, in a typical window oriented application, the whole process controlling the window is put in a locked status.

The user can be kept informed about the progress of the process for retrieving the dependent-objects from the external unit through message windows or status line information displayed for the user. However; the whole application is locked until the retrieve operation for the dependent objects from the external unit is completed.

Having to wait for the external dependent objects is one of many problems with the prior art for accessing dependent objects.

Another problem with the prior art in this area is that the condition is imposed that an object must have at least one dependent object locally defined in association thereto before an application accepts open/expand commands for that object. So, when none of the dependent objects have already been retrieved from the external unit, the selected object cannot be opened or expanded.

It is very hard for the user to know which objects will have dependent objects that are locally available or which of them have to be retrieved from the external unit.

It is an object of the present invention to overcome one or more of the afore-mentioned problems or drawbacks of the prior art.

SUMMARY OF THE INVENTION

According to the present invention, a method and system are provided for controlling the access to objects stored in a data processing system where a computer system is capable of exchanging data with an external unit, wherein the objects are hierarchically structured and each object being either locally available or retrievable from an external unit (non-locally available). A counter is associated with each object indicating whether there are objects dependent on the object. A dummy dependent object is associated with each locally available object having at least one non-locally available dependent object.

For each command accessing an object dependent on a selected object, the locally available objects dependent on the object are made accessible. Access is locked to the objects dependent on the selected object which are to be retrieved from the external unit. Access is unlocked to a non-locally available dependent object when all information related to that dependent object has been retrieved from the external unit.

A graphical symbol related to each locally available dependent object is displayed on a computer display. In one embodiment, a place-holder graphic symbol is displayed to represent all of the non-locally available dependent objects. When a dependent object is retrieved from the external unit, a graphical symbol related to that object is displayed (and that object becomes accessible to commands and operations). When all of the non-locally available objects are retrieved, the place-holder graphic symbol is removed from the display, and the dummy dependent object is deleted from the memory. In an alternate embodiment, a place-holder graphic symbol is displayed for each non-locally available dependent object and is replaced by the related graphic symbol for that object when that object has been retrieved from the external unit.

It is an object of this invention to improve the performance of applications involving the retrieval of non-locally available objects from external units. Locally available objects are made available to various related operations while a place-holder for non-locally available objects is displayed and these objects are locked and unaccessible. In that way, the entire application is not locked while waiting for the non-locally available objects to be retrieved.

It is a further object of this invention to allow objects having only non-locally available dependent objects to be expanded prior to the retrieval of the dependent objects from the external unit. The use of a dummy dependent object appended to a selected object allows the selected object to be expanded even when the dependent objects have not been retrieved from the external unit.

BRIEF DESCRIPTION OF THE DRAWINGS

The foregoing and other objects, features, and advantages of the present invention will be apparent from the following more particular description of the preferred embodiment of the invention, given as a non-restrictive example, as illustrated in the accompanying drawings, where.

DETAILED DESCRIPTION OF THE PREFERRED EMBODIMENT

Figure 1:
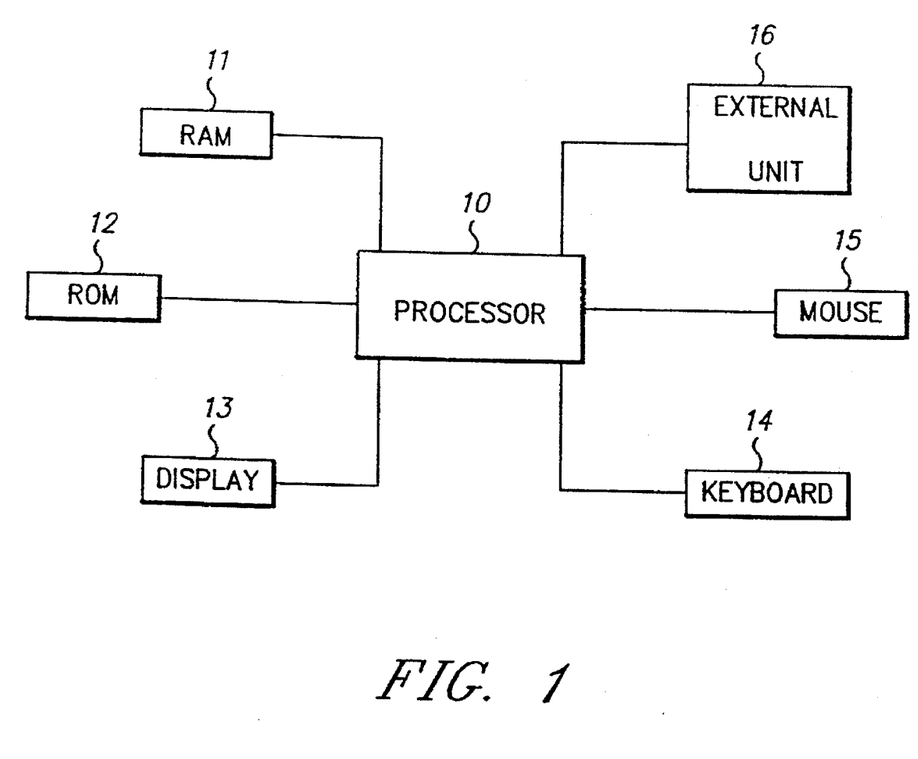
FIG. 1 is a pictorial representation of a data processing system which may be utilized for the implementation of the method and system of the present invention.

With reference now to the figures and in particular with reference to FIG. 1, there is depicted a pictorial representation of a data processing system which may be utilized for the implementation of the method and system of the present invention.

The data processing system includes a processor (10), a Random Access Memory or RAM (11), a Read Only Memory or ROM (12), a computer display monitor device (13) and a keyboard (14). A pointing device such as a mouse (15) is attached to the processor (10) as well.

One or more external units (16) are connected to the processor (10). The external unit refers to remote units, such as a host computer linked by network, Local Area Network (LAN) servers, and I/O devices, such as a local hard disk.

The processor (10) may be a microprocessor such as is found in the Personal System/2 (PS/2) from the International Business Machines Corporation. Data that is currently being processed is stored in the RAM (11).

In the preferred embodiment, the objects handled by the present invention may be either locally available in the RAM (11) or referenced and removed from an external unit (16). For instance, the objects may be stored in remote units, such as a host computer linked by network, in Local Area Network (LAN) servers, or in I/O devices, such as a local hard disk.

Figure 2:
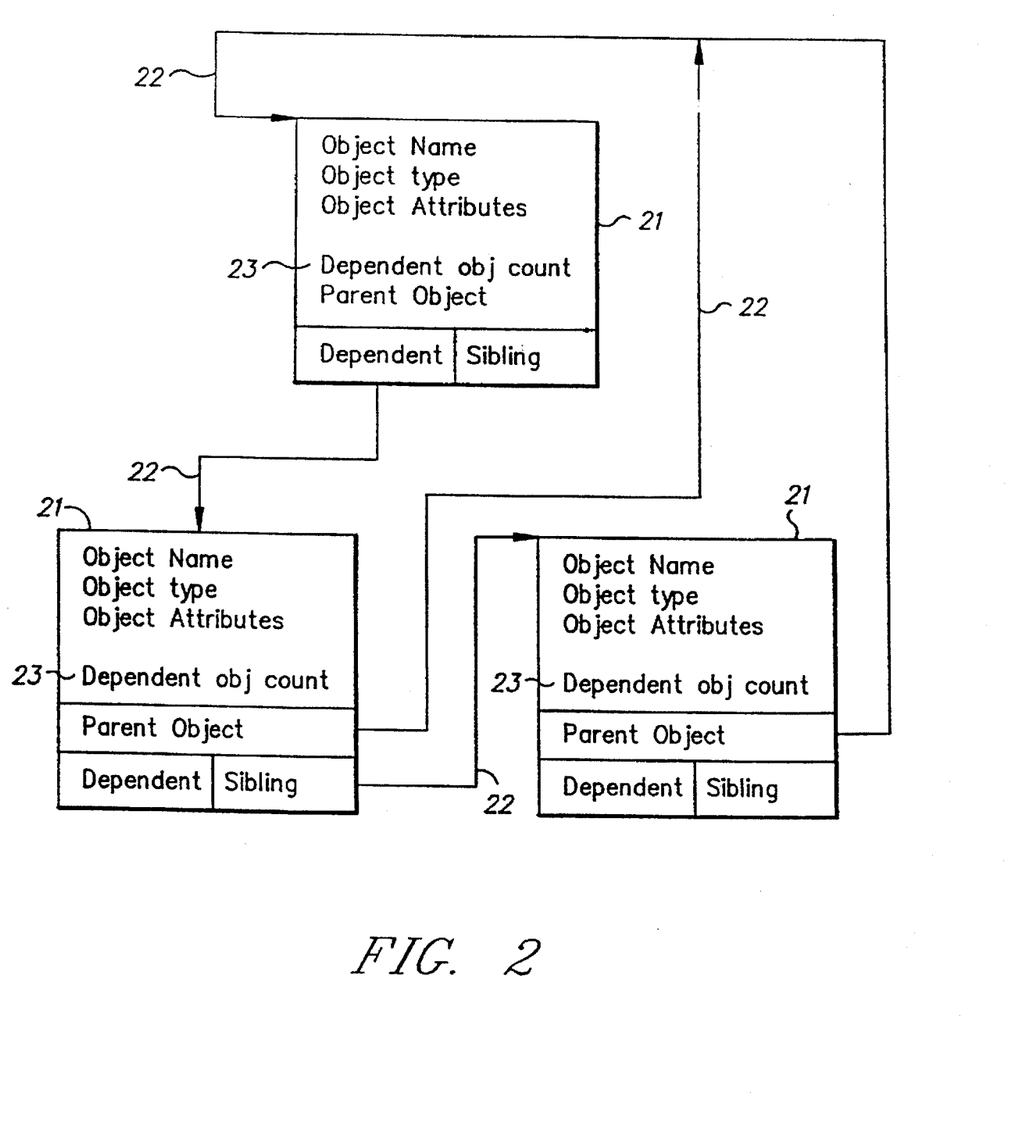
FIG. 2 shows the object structure in the data processing system according to the present invention.

FIG. 2 shows the representation in RAM (11) of the object structure in the data processing system according to the preferred embodiment of the present invention.

The objects are stored in a tree-like hierarchical structure, where the different objects are represented by control blocks (21) in RAM (11). The objects are linked by pointers (22) to the parent objects, the dependent (child) objects and the sibling objects.

Each object has a dependent object counter (23) which indicates the number of dependent child objects associated with the object. Alternatively, the counter may be a simple flag indicating the existence of at least one dependent object associated with that object.

The objects are retrieved from the external unit (16) a set at a time, where each set includes all of the objects of a given hierarchical level (i.e., all siblings) stored in the external unit. At each request, the external unit (16) transmits the next level objects in the hierarchy without transmitting the possibly existing dependent objects of the objects of that level.

All of the objects contain information about the existence of dependent objects (in the dependent object counter). This information is included in any response to a retrieve request from the external unit (16). The processing of a retrieval request for an external unit is well known to those skilled in the art.

When the dependent object counter is zero, meaning no dependent object exists, an open/expand function for this object is disabled since there is nothing to expand.

Through the dependent object counter, a processing program can determine if any locally available object has a dependent object. The system appends a dummy dependent object to a locally available object when at least one related dependent object is non-locally available.

Each locally available object has an associated related graphic symbol or icon. The related graphic symbol for the locally available dependent objects are displayed for the user on the display device.

The dummy dependent object is not displayed to the user. Instead, a place-holder graphic object symbol (icon) is displayed. The dummy object is always transformed into the object type of the actual object when the actual data object is retrieved, and a graphic symbol related to the actual data object is displayed for the user.

The dummy object is used mainly to indicate to the computer program controlling the graphical representation of the objects that the object has at least one dependent object (which happens to not be locally available).

Therefore, the dummy object enables the object to be expanded even if the dependent objects of the selected object are not yet locally available in the RAM (11).

The foregoing computer process will be described in greater detail with reference to FIGS. 3 and 4, which provide high level logic flow charts illustrating a preferred software implementation of the method and system of the present invention.

Figure 3:
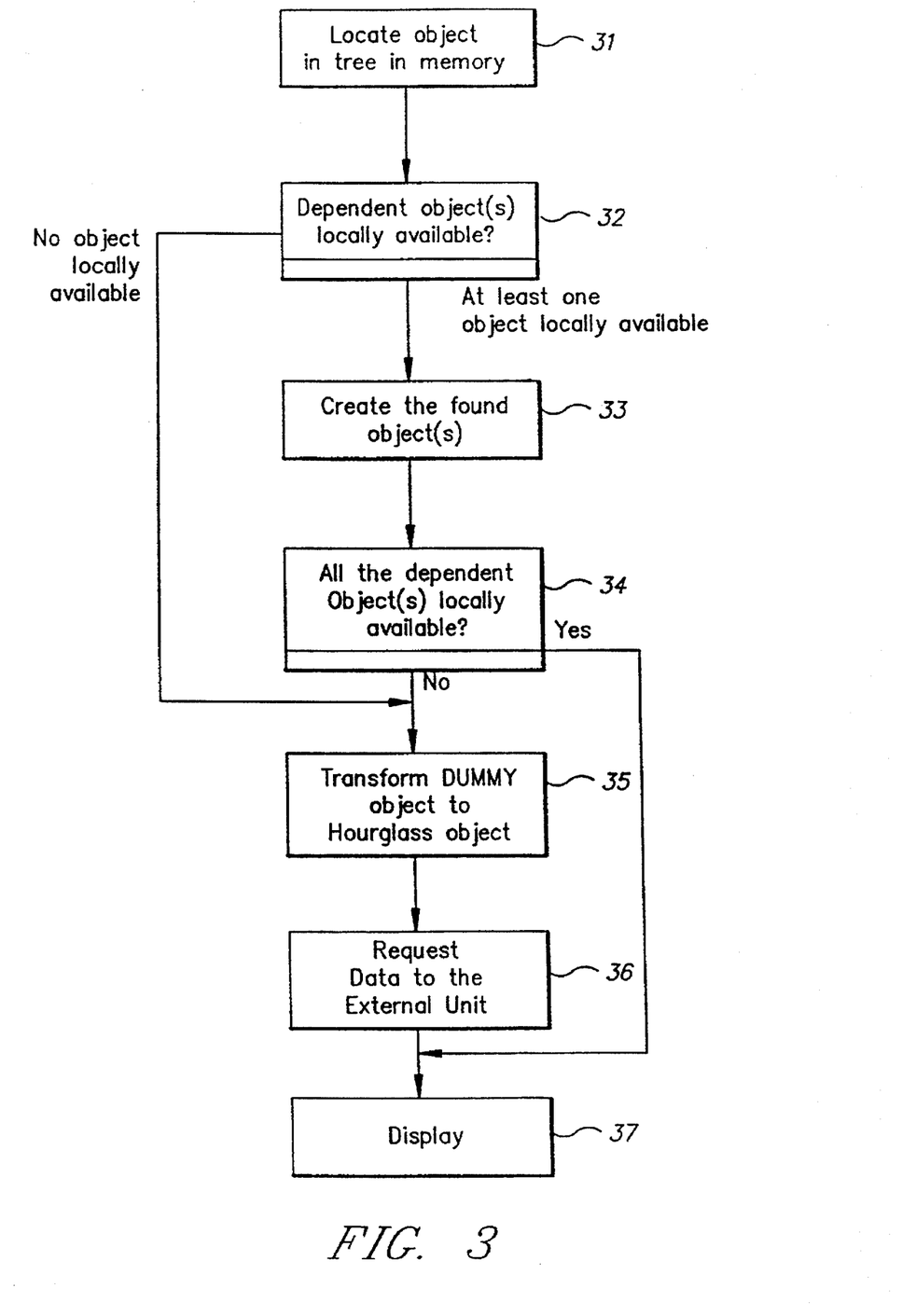
FIGS. 3, 4a and 4b are high level logic flow charts illustrating a software implementation of the method and system of the present invention.

Assuming that we already have an object in RAM (11) that is displayed for a user on the display (13), when the user selects an object, for example, by clicking an "open" option with the mouse (15), the application program sends a message to the processor that starts the method performed by the data processor illustrated in FIG. 3.

At block 31, the program determines the address of the selected object in the object tree stored in RAM (11).

Next, a determination is made of whether or not there is at least one locally available object dependent on the selected object (32). This determination can be made by using the dependent object count (23) and determining whether any of the dependent objects are in RAM (11).

When all of the information for at least one object is locally available, the system through instructions from the application program, creates an instance of all the locally available objects dependent on the selected object (block 33). Next, a determination is made of whether all of the objects dependent on the selected object are locally available (block 34).

When the answer is YES, (all dependent objects are locally available) the process passes to block 37 and graphic symbols related to each of the locally available objects are all displayed for the user on the display (13).

When not all of the dependent objects are locally available (as determined in block 34) or none of the dependent objects are locally available (as determined by block 32), the process control passes to block 35, where a dummy dependent object appended to the selected object is transformed into an object as a place-holder graphic symbol to be displayed to the user to indicate the current non-availability of objects dependent on the selected object. An example of a place-holder symbol is an hourglass shaped object. The hourglass object has no available function such as open/ expand commands associated with it; hence, the access to this hourglass object is locked. The dummy object can be appended to an object having non-locally available dependent objects either as a preliminary step or at the beginning of block 35.

In an alternate embodiment, the dependent object counter indicates the number of objects dependent on the object (rather than the existence of dependent objects). The dummy object is then substituted with as many place-holder symbols (hourglasses) as the number of dependent objects that are still to be retrieved from the external unit (16).

Following block 35, the process passes to block 36, where a specific request for data (information) related to the non-locally available dependent object is built. The request is sent to a data processing system component managing the communication with the external unit (16). The address of the memory representation of the selected object is passed as a parameter in the request to that component. The process for requesting and retrieving of data from external units is well known to those skilled the art.

Referring to block 37, all of the graphic symbols related to dependent objects and the hourglass place-holder graphic symbols for the non-locally available dependent objects that have not yet been retrieved from the external unit are shown on the display (13) for the user.

The hourglass or hourglasses act to advise the user that the process of retrieving all of the dependent objects from an external unit (16) is still in progress.

The user can operate on any of the other objects already present locally having a related graphic symbol displayed without waiting for the reception of all data for the non-locally available dependent objects from the external unit.

Figure 4A:
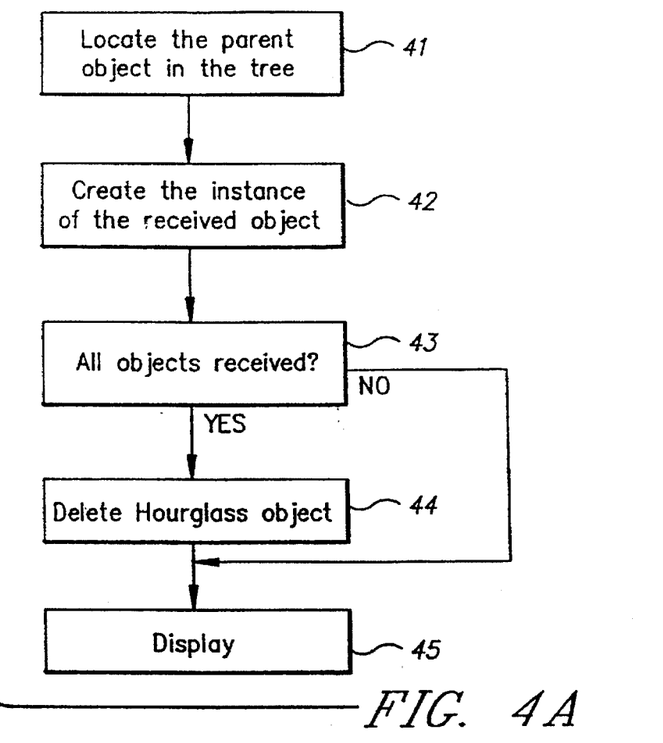
Figure 4B:
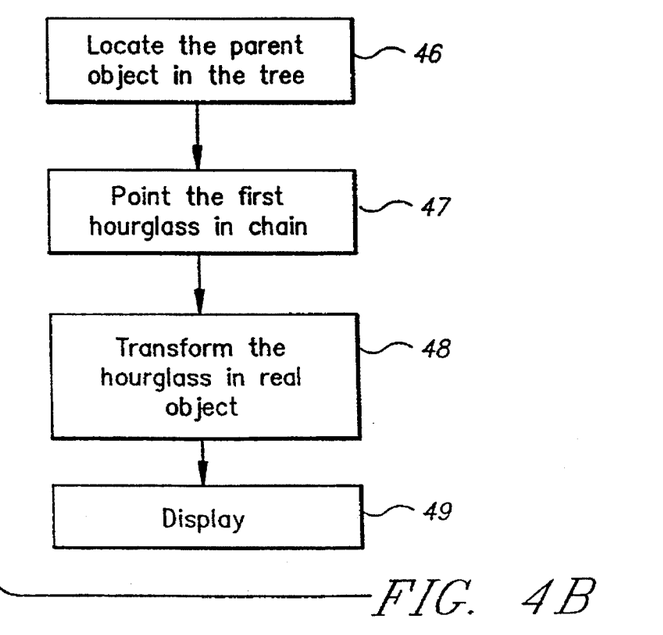

When the component managing the communication with the external unit (16) is notified that one of the requested non-locally available dependent objects has arrived from the external unit, this component sends a message to the processor application that starts one of the processes illustrated in FIGS. 4a and 4b for displaying the retrieved object.

FIG. 4a depicts the case where there is only one hourglass representing all of the non-locally available dependent objects. FIG. 4b depicts the case where there is an hourglass for each non-locally available dependent object.

Referring to FIG. 4a, at step 41, the address in memory of the representation of the retrieved dependent object in the hierarchical tree is passed back, and the program determines the address of the parent (selected) object in the tree and stores these values in RAM (11) in a manner well known to those skilled in the art.

The process control passes to block 42, where the program creates an instance of the retrieved dependent object in a manner that is well known to those skilled in the art. A graphical symbol related to the object that has been associated with the object is shown on the display.

Referring now to block 43, the processor makes a determination of whether all the non-locally available objects dependent on the selected object have been retrieved from the external unit.

When the answer is YES and all dependent objects have been retrieved and are available, the process passes to block 44, where the dummy object dependent on the selected object is deleted from the tree in RAM (11) and the hourglass symbol is deleted from the display.

From block 44 or when not all dependent objects have been retrieved (as determined by block 43), the process passes to block 45 where the system causes the graphic symbol related to the retrieved object to be shown in the display.

When all the dependent objects have been retrieved and the hourglass symbol has been deleted, all the object symbols are shown on the display (13) and are all available to all functions and commands.

Referring now to the alternate embodiment shown in FIG. 4b, at step 46, the address of the memory representation of the dependent object in the tree is passed back from the external unit, and the program determines the address of the parent object in the tree in RAM (11).

The process control passes to block 47, where the program locates the first displayed hourglass object dependent on the selected (parent) object.

Referring now to block 48, the hourglass object is transformed into the actual object symbol associated with the dependent object retrieved in a manner well known to those skilled in the art.

At block 49, all of the graphic object symbols and the remaining hourglass symbols are shown on the display (13).

This process continues until all data has been retrieved and there are no hourglass symbols remaining on the display.

The foregoing process is completely recursive without limitation in the number of hierarchy levels. All messages are completely asynchronous and the other objects locally available can be accessed while the above flow is running.

Figure 5:
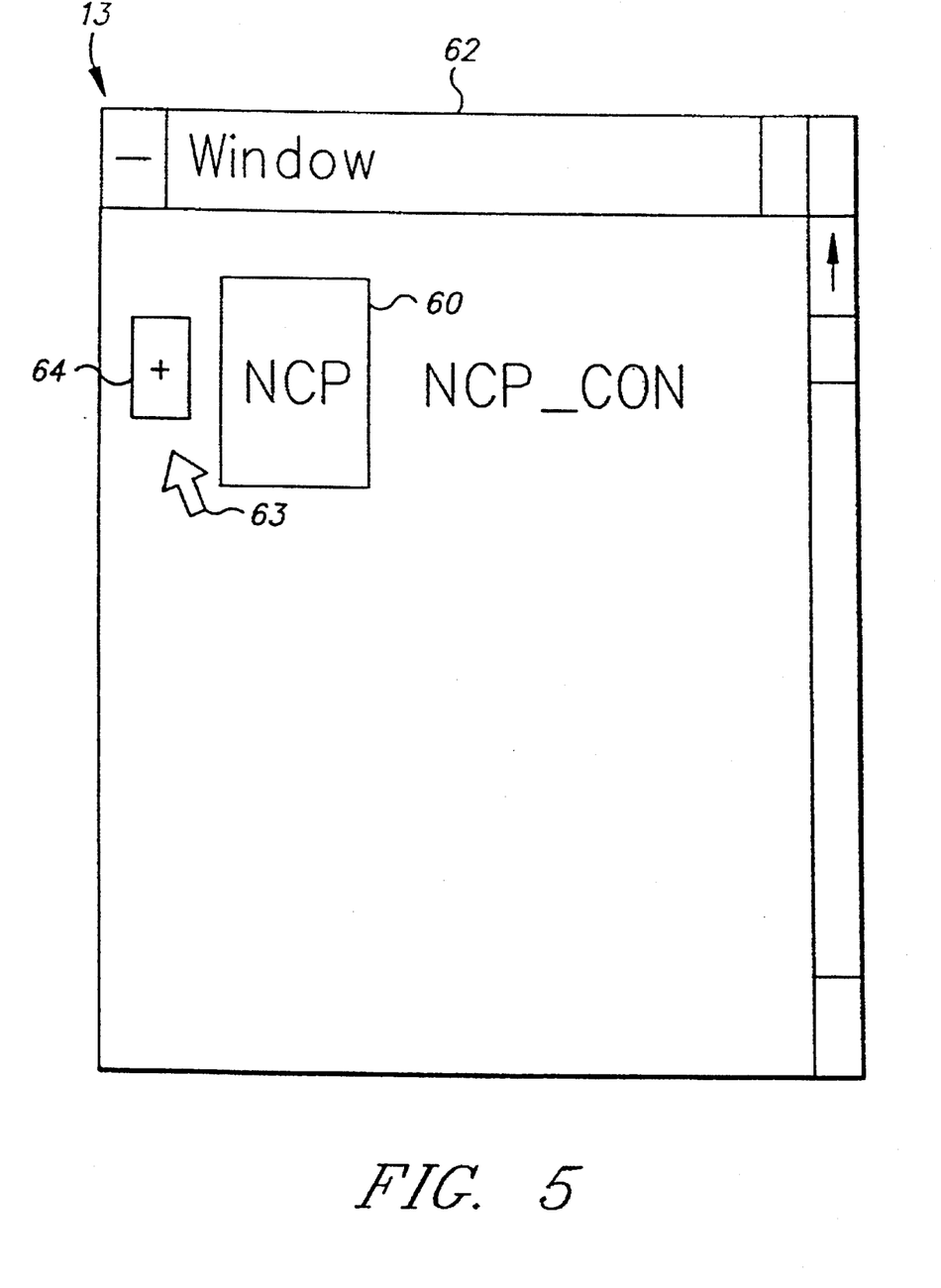
FIG. 5 is a pictorial representation of a computer display at an initial state of displaying related objects.

FIG. 5 is a pictorial representation of the display (13) at an initial state of displaying related objects according to the system and method of the present invention. An object (named NCP_CON) is locally available in the tree in RAM (11) and the related graphic symbol (60) is shown in a window (62).

The user can position a mouse cursor (63) using a mouse (15) over the object symbol to select the object. The user can then use a menu (or other methods that are well known to those skilled in the art) to apply an open/expand command function to the selected object. One such method would be to click on an expand symbol (64).

Figure 6:
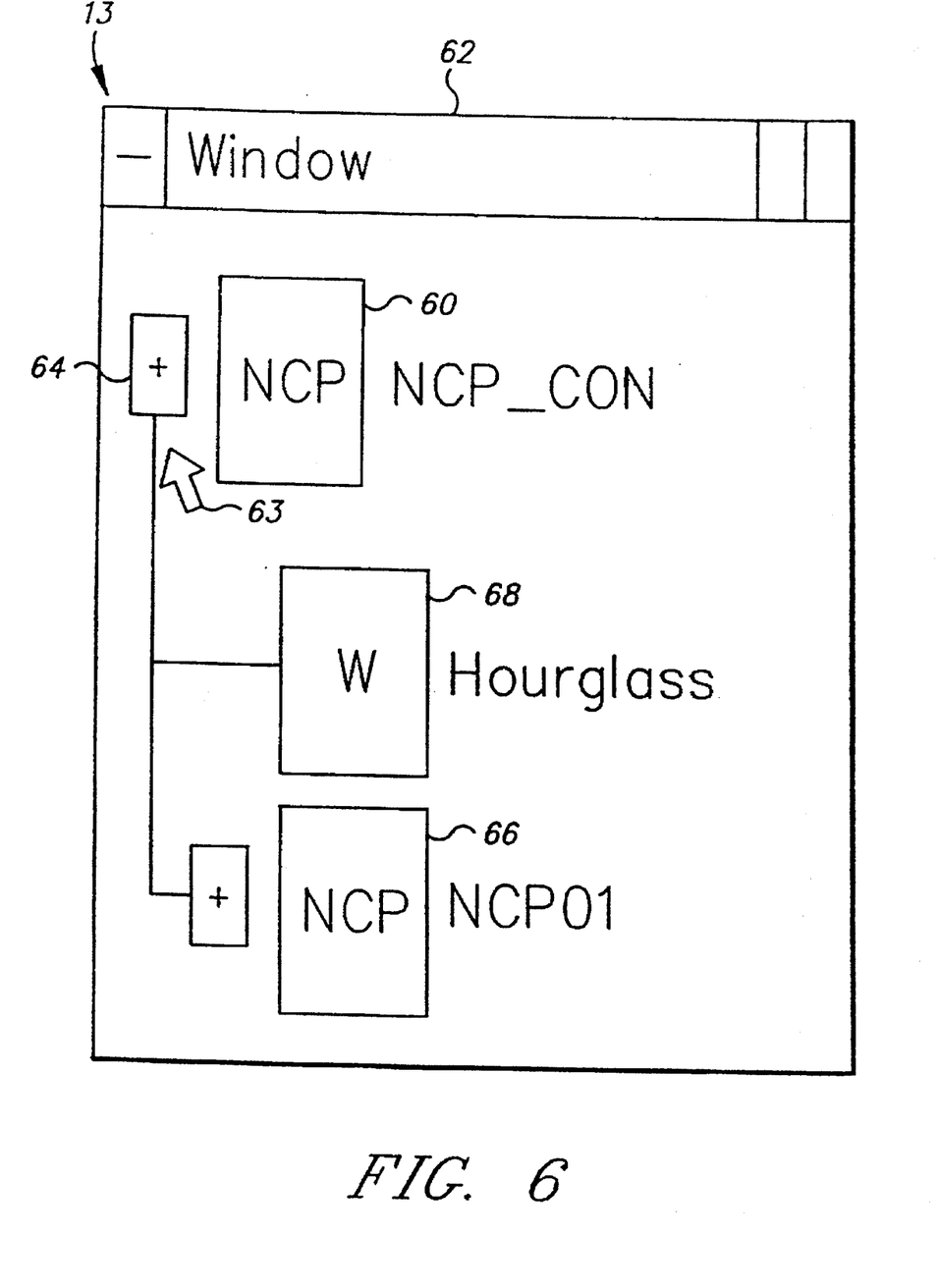
FIG. 6 is a pictorial representation of the computer display of FIG. 5 at an intermediate state.

FIG. 6 shows an intermediate state on the display (13), when the user expands the object NCP_CON, by clicking on the mouse (15) when the mouse cursor (63) is positioned over the expand button (64). When some dependent objects are locally available and others are to be retrieved from the external unit (16), the graphic symbols (66) related to locally available objects NCP01 are displayed in the window and the object stored in a tree in RAM (11), while a place-holder object such as an hourglass is created in RAM (11) and the place-holder symbol (hourglass) (68) is shown on the display (13). Only the displayed objects are accessible by other functions. The hourglass symbols have no available functions and therefore cannot be accessed.

Figure 7:
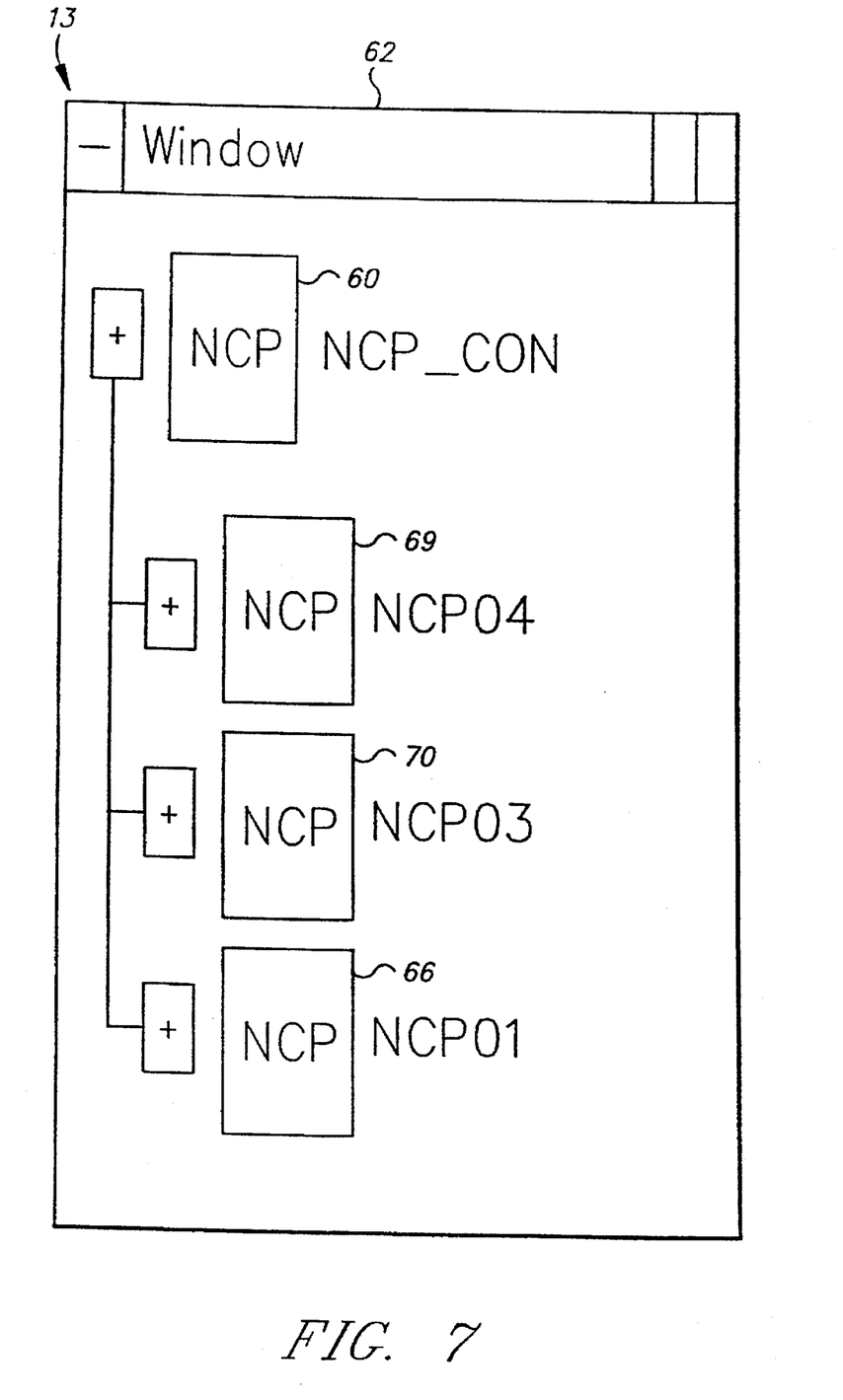
FIG. 7 is a pictorial representation of the computer display of FIGS. 5 and 6 at an end state.

FIG. 7 is a pictorial representation of the display (13) at the end state, when all data has been retrieved from the external unit (16) for the actual dependent objects NCP03 and NCP04. The related graphical symbols (69,70) are displayed in the window. The non-locally available dependent object (NCP03 and NCP04) symbols (69,70) are substituted for the hourglass in the window on the display (13). The selected object (NCP_CON) and all dependent objects (NCP04, NCP03 and NCP01) are available for other operations (including expand operations).

While the preferred embodiment of the present invention has been illustrated in detail, it should be apparent that modifications and adaptations to that embodiment may occur to one skilled in the art without departing from the scope of the present invention as set forth in the following claims.

We claim:

1. An article of manufacture for use in a computer system to control the access to objects in a data processing application capable of exchanging data with at least one external unit, the objects being hierarchically structured and each of the objects being either locally available or retrievable from an external unit, said article of manufacture comprising a computer readable storage medium having a computer program code embodied in said medium which may cause the computer to:

associate a counter with each object indicating whether there is at least one object dependent on the object;

append a dummy dependent object to each locally available object having at least one object dependent on the locally available object that is retrievable from an external unit;

select an object;

make accessible for a command accessing an object dependent on the selected object, an object dependent on the selected object that is locally available and locking the access to an object dependent on the selected object which is retrievable from an external unit; and unlock the access to an object dependent on the selected object that is retrievable from an external unit when all related information has been retrieved from an external unit.

2. The article of manufacture of claim 1 wherein the computer program code may cause the computer to control the access to objects in a data processing application by causing the computer to remove the dummy dependent object appended to the selected object when all of the objects dependent on the selected object that are retrievable from an external unit have been retrieved from an external unit.

3. The article of manufacture of claim 1 wherein the computer program code may cause the computer to control the access to objects in a data processing application by causing the computer to associate with each locally available object a related graphic symbol;

display said related graphic symbol on a computer display;

associate with the dummy dependent object appended to the selected object a place-holder graphic symbol indicating the non-local availability of at least one object dependent on the selected object;

display said place-holder graphic symbol on the computer display;

associate with each object dependent on the selected object that is retrievable from an external unit, a new related graphic symbol when all related information has been retrieved from an external unit;

display said new related graphic symbol on the computer display; and delete said place-holder graphic symbol when all of the objects dependent on the selected object that are retrievable from an external unit have been retrieved from an external unit.

4. The article of manufacture of claim 1 wherein the computer program code may cause the computer to control the access to objects in a data processing application by causing the computer to associate with each object a counter indicating the number of objects dependent on the object.

5. The article of manufacture of claim 4 wherein the computer program code may cause the computer to control the access to objects in a data processing application by causing the computer to:

associate with each locally available object a related graphic symbol;

display said related graphic symbol on a computer display;

associate with each object dependent on said selected object that is retrievable from an external unit a place-holder graphic symbol indicating the non-local availability of the dependent object;

display said place-holder graphic symbol on the computer display; and replace said displayed place-holder symbol with a related graphic symbol related to the dependent object when all related information has been retrieved from an external unit.

6. In a data processing system comprising a computer system in communication with at least one external unit, the computer system comprising memory and a central processing unit (CPU), an article of manufacture for use in said computer system to control access to a plurality of objects stored in the data processing system, the objects being arranged in a hierarchy comprising child objects dependent on parent objects, each object being either a locally available object or a non-locally available object retrievable from an external unit, said article of manufacture comprising a computer-readable storage medium having a computer program code embodied in said medium which may cause the CPU to:

associate in memory a counter with each of said objects indicating whether said object has at least one child object dependent on said object;

append a dummy object to each locally available object having at least one non-locally available child object;

make accessible for an operation all of the locally available child objects dependent on a selected object;

lock access to all of the non-locally available child objects dependent on said selected object which are to be retrieved from an external unit; and unlock access to a non-locally available child object dependent on said selected object when said non-locally available child object has been retrieved from an external unit.

7. The article of manufacture of claim 6 wherein the computer program code may cause the computer to control access to objects in a data processing system by causing the computer to remove said dummy object associated with said selected object when all of the non-locally available child objects dependent on said selected object have been retrieved from an external unit.

8. The article of manufacture of claim 6 wherein the computer program code may cause the computer to control access to objects in a data processing application system by causing the computer to:

associate in memory with each locally available child object a related graphic symbol;

display said related graphic symbol on a computer display;

associate in memory with each dummy object a place-holder graphic symbol indicating the non-local availability of at least one child object dependent on said selected object;

display said place-holder graphic symbol on said computer display;

when a non-locally available child object dependent on said selected object has been retrieved from the external unit,
- associate in memory with said non-locally available child object a related graphic symbol; and
- display on the computer display said related graphic symbol for said retrieved non-locally available child object; and remove from memory and from the computer display said place-holder graphic symbol when all of the non-locally available child objects dependent on said selected object have been retrieved from an external unit.

9. The article of manufacture of claim 6 wherein the computer program code may cause the computer to control access to objects in a data processing system by causing the computer to associate with each of said objects a counter indicating the number of child objects dependent on said object.

10. The article of manufacture of claim 6 wherein the computer program code may cause the computer to control access to objects in a data processing system by causing the computer to:

associate in memory with each locally available object a related graphic symbol;

display said related graphic symbol on a computer display;

associate in memory with each non-locally available child object dependent on said selected object, a place-holder graphic symbol;

display said place-holder graphic symbol on the computer display; and replace said place-holder graphic symbol with a related graphic symbol related to said non-locally available child object, when said non-locally available child object has been retrieved from the external unit.

11. The article of manufacture of claim 6 wherein the computer program code may cause the computer to control access to objects in a data processing system wherein an external unit is a DASD.

12. The article of manufacture of claim 6 wherein the computer program code may cause the computer to control access to objects in a data processing system wherein an external unit is a computer system.

* * * * *